United States Patent [19]
Greenberg

[11] 3,844,546
[45] Oct. 29, 1974

[54] CLAMPING FIXTURE FOR A TUBULAR WORKPIECE
[75] Inventor: Donald K. Greenberg, Rockford, Ill.
[73] Assignee: Barnes Drill Co., Rockford, Ill.
[22] Filed: Nov. 9, 1973
[21] Appl. No.: 414,510

[52] U.S. Cl.............. 269/22, 269/48.1, 269/287, 279/1 Q, 279/2 A, 279/4
[51] Int. Cl............................................. B23q 3/00
[58] Field of Search ..... 51/227 R; 269/20, 22, 48.1, 269/287; 279/1 Q, 2 A, 4

[56] References Cited
UNITED STATES PATENTS
| | | | |
|---|---|---|---|
| 163,217 | 5/1875 | Lawson | 279/1 Q |
| 2,667,139 | 1/1954 | Campbell | 269/48.1 |
| 2,720,735 | 10/1955 | Ruehl | 279/4 |
| 3,602,521 | 8/1971 | Uhtenwoldt | 279/1 Q |

Primary Examiner—Roy Lake
Assistant Examiner—Mark S. Bicks
Attorney, Agent, or Firm—Wolfe, Hubbard, Leydig, Voit & Osann, Ltd.

[57] ABSTRACT

The workpiece is telescoped into stacked rings made of resiliently yieldable material and adapted to be compressed axially so as to expand radially into frictional gripping engagement with the workpiece.

10 Claims, 3 Drawing Figures

PATENTED OCT 29 1974  3,844,546

3,844,546

CLAMPING FIXTURE FOR A TUBULAR WORKPIECE

BACKGROUND OF THE INVENTION

This invention relates to a fixture for holding a comparatively thin walled tubular workpiece in a stationary position while a machining operation such as honing and grinding is being performed on the workpiece. More particularly, the invention relates to a fixture which grips or clamps the workpiece with radially directed pressure.

SUMMARY OF THE INVENTION

The general aim of the present invention is to provide a new and improved fixture which, when compared with prior fixtures of the same general type, is better able to securely grip a tubular workpiece of non-uniform diameter and/or wall thickness without detrimentally distorting the thin walls of the workpiece and while keeping the resistance of the walls to radial flexing substantially uniform along the length of the workpiece.

A further object is to provide a comparatively versatile fixture which may be easily constructed to grip workpieces of different diameters and/or wall thicknesses.

A more detailed object is to achieve the foregoing through the provision of a fixture which includes a stack of resiliently flexible rings telescoped with the workpiece and adapted to expand radially into gripping engagement with the workpiece when compressed axially by axially directed pressure.

Still another object is to provide unique means for applying axially directed pressure to the rings and for facilitating axial expansion of the rings upon release of the pressure.

The invention also resides in the novel construction and arrangement of the rings to promote optimum gripping of the workpiece.

These and other objects and advantages of the invention will become more apparent from the following detailed description when taken in conjunction with the accompanying drawings.

DETAILED DESCRIPTION OF THE PREFERRED EMBODIMENT

Figures 1, 2:
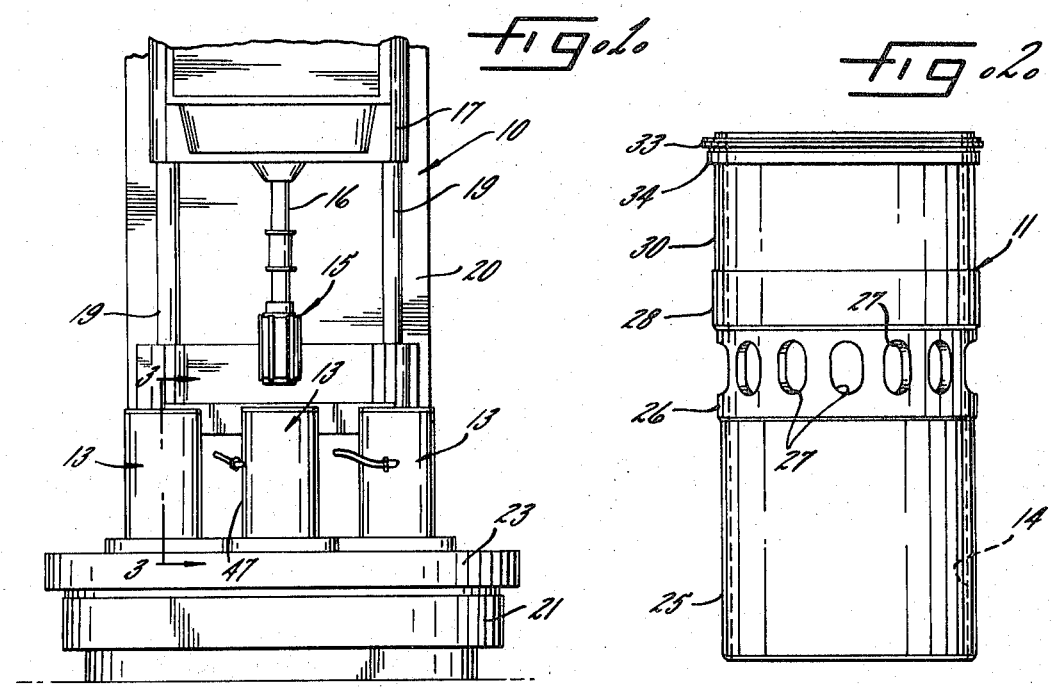
FIG. 1 is a fragmentary front elevational view of an exemplary machine tool equipped with a new and improved workpiece fixture embodying the novel features of the present invention.
FIG. 2 is a front elevational view of an exemplary workpiece adapted to be held by the fixture.

For purposes of illustration, the invention is shown in the drawings in conjunction with a vertical honing machine 10 in which an elongated cylindrical work sleeve 11 (FIG. 2) such as a tubular cylinder liner is clamped in a fixture 13 to locate its bore 14 in position to be honed in a succession of vertical reciprocations of an expandable rotary honing tool 15. The latter is carried on the lower end of a tubular spindle 16 projecting downwardly from and journaled on a rigid head 17 which is accurately guided for up and down movement along laterally spaced rods 19 mounted on a column 20 upstanding from the supporting bed 21 of the machine. Suitable drive mechanism (not shown) is incorporated in the machine for reciprocating the head and rotating the spindle during a honing cycle in which the rotating hone 15 first enters the bore 14, is expanded radially and then reciprocates upwardly and downwardly within the bore until the latter is enlarged to a precisely determined diameter.

The clamping fixture 13 for holding the sleeve 11 during the honing operation is located below the head 17 and, in the exemplary machine shown in the drawings, is supported on a rotary turn table 23 on the bed 21. The sleeve is loaded into the fixture while the latter is spaced angularly from the hone 15 and thereafter the table 23 is indexed to advance the sleeve into vertical alinement with the hone.

In the present instance, the cylinder liner or sleeve 11 (FIG. 2) is formed of hard cast iron of 45 Rockwell "C" hardness and is approximately 11 inches long. While the inside diameter of the sleeve is substantially uniform throughout the length of the sleeve, the outside diameter and wall thickness are different at different points along the length. Thus, the sleeve includes a lower section 25 with an outside diameter of approximately 5¼ inches and a wall thickness of approximately 3/16 inches. An intermediate section 26 has a slightly larger outside diameter and is formed with a series of angularly spaced ports 27 which increase the flexibility of the wall of the intermediate section. Immediately above the intermediate section is a band 28 with a still larger outside diameter. The upper section 30 of the sleeve has a slightly smaller outside diameter than the band 28 and its wall thickness and diameter are just somewhat larger than the wall thickness and diameter of the lower section 25. The extreme upper end of the sleeve is formed with an enlarged collar and flange indicated by the reference numerals 33 and 34, respectively.

The present invention brings to the art a novel fixture 13 which radially grips and tightly holds a tubular workpiece without appreciably distorting the walls thereof and which is particularly adapted to grip a workpiece, such as the sleeve 11, having a non-uniform diameter and/or wall thickness. The fixture is characterized by a series of resiliently flexible rings 40 (FIG. 3) adapted to telescope with the workpiece and adapted, when compressed axially, to expand radially into gripping engagement with the workpiece to securely hold the latter.

More specifically, the rings 40 are sandwiched between a pair of rigid upper and lower end members 45 and 46 (FIG. 3) and are telescoped into an outer cylinder 47, the latter confining the rings against outward radial expansion when the rings are compressed axially. The lower end member 46 comprises a solid block having a radial flange 49 upon which the cylinder 47 is supported and to which the cylinder is fastened by screws 50. The lower end of the block 46 is formed with a pilot 51 adapted to telescope into a hole 53 formed in the table 23, the fixture 13 being secured to the table by screws 54 extending through the flange 49. A hardened steel ring 55 is attached to the upper side of the block 46 and acts as a pilot to receive and locate the extreme lower end of the sleeve 11 when the latter is telescoped into the rings 40.

The upper end member 45 comprises a steel annulus formed with a counterbore 57 (FIG. 3) for receiving the flange 34 of the sleeve 11. Screws 59 extend through a radial flange 60 on the upper end member 45 to secure the latter to the upper end of the cylinder 47.

Figure 3:
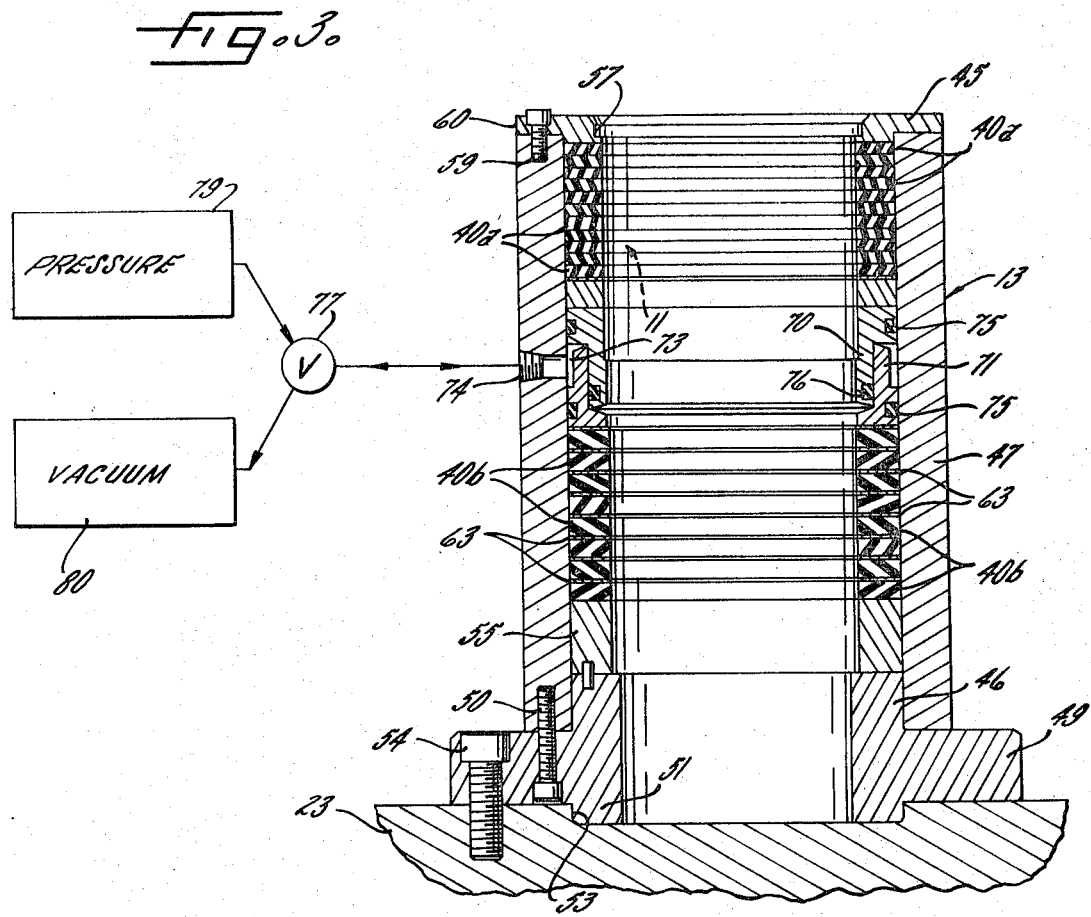
FIG. 3 is an enlarged fragmentary cross-section of the fixture as taken substantially along the line 3—3 of FIG. 1, this view also schematically showing a fluid circuit which is associated with the fixture.

In this instance, the fixture 13 includes upper and lower stacks of rings 40a and 40b (FIG. 3). The rings 40b of the lower stack are all identical to one another and preferably are made of polyurethane or other similar resiliently yieldable material, the rings 40b used herein having a Shore durometer hardness of 80. The rings 40b are separated from one another by steel spacers 63 and are located within the cylinder 47 so as to receive the lower section 25 of the sleeve 11. When the rings 40b are relaxed, there exists a small amount of radial clearance between the outer surface of the lower section 25 and the inner surfaces of the rings.

As shown in FIG. 3, the rings 40a of the upper stack are backed by the upper end member 45 and are positioned to receive the band 28, the upper section 30 and the collar 34 of the sleeve 11. The inside diameters of the upper rings 40a are somewhat enlarged so that the band 28 may be inserted into the rings. Thus, when the rings are relaxed, the radial clearance between the upper section 30 and the surrounding rings is somewhat greater than the clearance between the band 28 and the rings which encircle the band. The rings 40a of the upper stack are somewhat thinner than the lower rings 40b and are disposed in direct face-to-face relation with one another. Except for the uppermost ring of the upper stack, the rings 40a are softer (e.g., 60 durometer polyurethane) than the lower rings 40b so as to expand radially by a greater degree when compressed axially. The uppermost ring of the upper stack is of the same hardness as the lower rings 40b and acts as a locating pilot for the collar 34 at the upper end portion of the sleeve 11.

Unique means are provided for applying axial pressure to the rings 40a and 40b in order to axially compress and radially expand the rings. Herein, these means comprise upper and lower ring-like pistons 70 and 71 (FIG. 3) sandwiched between the upper and lower stacks of rings and sized to surround the ported intermediate section 26 of the sleeve 11 with radial clearance. The pistons are telescoped slidably with one another and with the outer cylinder 47 and coact with the inner surface of the outer cylinder to define an annular chamber 73 which is coaxial with the rings 40a and 40b, there being a port 74 leading through the cylinder and communicating with the chamber for the purpose of admitting pressure fluid into the chamber. Resilient rings 75 establish a fluid-tight seal between the pistons and the inner surface of the cylinder 47 while a similar ring 76 establishes a seal between the two pistons. When a valve 77 is positioned to admit pressure fluid such as hydraulic oil into the chamber 73 from a source 79, the pistons 70 and 71 are shifted axially in opposite directions to compress the rings 40a and 40b axially between the end members 45 and 46 and thereby cause the rings to expand radially inwardly into gripping engagement with the sleeve 11. In keeping with the invention, the valve may be selectively positioned to cause the chamber 73 to communicate with a vaccuum source 80 after the honing operation has been completed. With the chamber being subjected to negative pressure, the rings expand more freely in an axial direction so as to facilitate easy removal of the sleeve from the fixture.

With the foregoing arrangement, the sleeve 11 is telescoped into the fixture 13 while the rings 40a and 40b are relaxed. Thereafter, pressure fluid is admitted into the chamber 73 to axially compress the rings and thereby radially expand the rings into frictional gripping engagement with the sleeve. By virtue of being softer, the upper rings 40a surrounding the sleeve section 30 expand to a greater degree than the lower rings and take up the greater clearance which exists between the upper rings and the upper section 30. Because of the metal spacers 63, the lower rings 40b expand somewhat more independently of one another than the upper rings 40a and are capable of conforming to and tightly gripping the sleeve 11 even if the outer surface of the lower section 25 is not of uniform diameter throughout its length or is not truly circular. The relatively weak ported section 26 of the sleeve is not clamped by the inner surfaces of the surrounding pistons 70 and 71 and thus this section is not subject to being deflected inwardly by radial pressure. Also, in spite of the tight gripping effected by the rings 40a and 40b, the relatively thin walls of the upper and lower sections 25 and 30 do not deflect or distort inwardly by any significant degree and thus the hone 15 is capable of forming a more nearly cylindrical bore 14 in the sleeve as the hone is reciprocated upwardly and downwardly. With the size and softness of the rings 40a and 40b being correlated with the varying outside diameter and wall thickness of the sleeve, the resistance of the walls to outward radial flexing is approximately the same throughout the length of the sleeve. Accordingly, the hone may finish the bore to a more nearly true cylinder than is the case when the walls flex differentially under the radial pressure applied by the expanding hone as the latter reciprocates in the bore.

From the foregoing, it will be apparent that the present invention brings to the art a unique fixture 13 in which the rings 40a and 40b effect secure gripping of the sleeve 11 in spite of the non-uniformity of the outside diameter of the sleeve. By changing the arrangement of the rings, the fixture may be easily constructed or "programmed" to hold workpieces with different outside configurations. The rings may be inexpensively stamped from sheet material and, in addition to holding the sleeve, the rings serve to dampen and reduce the noise of the honing operation.

While the invention has been disclosed specifically in conjunction with a fixture 13 which grips the outside of a tubular workpiece, it should be appreciated that the same principles may be employed for holding a tubular workpiece on its inner surface while a machining operation such as grinding is being performed on the outer surface of the workpiece. In such a case, the workpiece is telescoped over the rings, a cylinder is telescoped into the rings to prevent the rings from expanding radially inwardly, and suitable modifications are made to enable the delivery of pressure fluid to the piston chamber from the inside of the fixture.

I claim as my invention:

1. A fixture for holding a tubular workpiece during the performance of a machining operation on the workpiece, said fixture comprising a pair of rigidly supported end members, a first stack of rings backed at its outer end by one of said end members, a second stack of rings backed at its outer end by the other of said end members, said workpiece being telescoped with said rings, said rings being made of resiliently yieldable material capable of expanding radially when compressed axially, means telescoped with said rings and restricting the rings against radial expansion away from said workpiece, and selectively operable means for compressing said rings axially against said end members whereby the rings expand radially toward the workpiece and into gripping engagement with the workpiece, said selectively operable means comprising a fluid operated actuator having a chamber and having a pair of pistons slidable within and disposed at opposite ends of said chamber, said chamber and pistons being generally annular and being located between the inner ends of said first and second stacks of rings and in coaxial relationship with said rings, and means for selectively admitting pressure fluid into said chamber to shift said pistons axially in opposite directions and thereby compress said rings axially between said pistons and said end members.

2. A fixture as defined in claim 1 in which said means for restricting said rings against radial expansion comprise a member telescoped with said rings, said member defining one wall of said chamber.

3. A fixture as defined in claim 1 further including selectively operable means for creating a negative pressure in said chamber to facilitate reverse shifting of said pistons when said pressure fluid is dumped from said chamber and said rings expand axially to release said workpiece.

4. A fixture for holding a tubular workpiece during the performance of a machining operation on the interior of the workpiece, said fixture comprising a pair of rigidly supported end members, a first stack of rings backed at its outer end by one of said end members, a second stack of rings backed at its outer end by the other of said end members, said workpiece being telescoped into said rings, said rings being made of resiliently yieldable material capable of expanding radially when compressed axially, means telescoped over said rings and preventing said rings from expanding radially outwardly, and selectively operable means for compressing said rings axially against said end members whereby the rings expand radially inwardly into gripping engagement with the workpiece, said selectively operable means comprising a fluid operated actuator having a chamber and having a pair of pistons slidable within and disposed at opposite ends of said chamber, said chamber and pistons being generally annular and being located between the inner ends of said first and second stacks of rings and in coaxial relationship with said rings, and means for selectively admitting pressure fluid into said chamber to shift said pistons axially in opposite directions and thereby compress said rings axially between said pistons and said end members.

5. A fixture as defined in claim 4 in which the durometer hardness of some of said rings is greater than the hardness of other ones of said rings.

6. A fixture as defined in claim 5 in which the inside diameter of some of said rings is greater than the inside diameter of other ones of said rings.

7. A fixture as defined in claim 6 in which comparatively rigid spacers are sandwiched between at least some of said rings.

8. A fixture as defined in claim 4 in which said means for restricting said rings against outward radial expansion comprise a cylinder telescoped over said rings, the inner wall of said cylinder defining the outer wall of said chamber.

9. A fixture as defined in claim 8 further including selectively operable means for creating a negative pressure in said chamber to facilitate reverse shifting of said pistons when said pressure fluid is dumped from said chamber and said rings expand axially to release said workpiece.

10. A fixture as defined in claim 9 in which the durometer hardness and inside diameter of the rings of said first stack are different from the inside diameter and durometer hardness of the rings of said second stack, there being comparatively rigid spacers disposed between the rings of one of said stacks.

* * * * *